J. J. GALEY.
NUT LOCK.
APPLICATION FILED AUG. 24, 1908.

918,527.  Patented Apr. 20, 1909.

Witnesses
Row S. Johnson
L. O. Little

Inventor
J. J. Galey
By Watson E. Coleman
Attorney

UNITED STATES PATENT OFFICE.

JOHN JAMES GALEY, OF ATWOOD, TENNESSEE.

NUT-LOCK.

No. 918,527.  Specification of Letters Patent.  Patented April 20, 1909.

Application filed August 24, 1908. Serial No. 449,932.

*To all whom it may concern:*

Be it known that I, JOHN JAMES GALEY, a citizen of the United States, residing at Atwood, in the county of Carroll and State of Tennessee, have invented certain new and useful Improvements in Nut-Locks, of which the following is a specification, reference being had to the accompanying drawings.

This invention relates to improvements in nut locks and it consists of the novel features of construction and the combination and arrangement of parts hereinafter fully described and claimed.

The object of the invention is to provide a simple and practical device of this character in which the nut will be effectively locked to the bolt.

The above and other objects of the invention are attained in its preferred embodiment illustrated in the accompanying drawings, in which—

Figure 1:
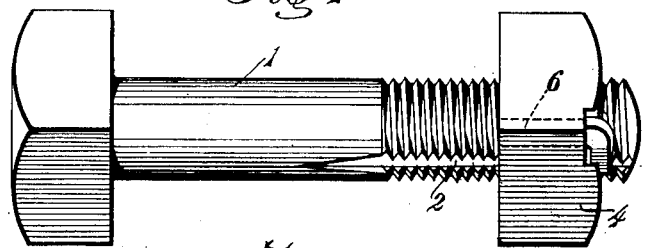
Figure 2:
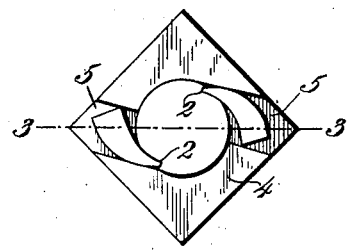
Figure 3:
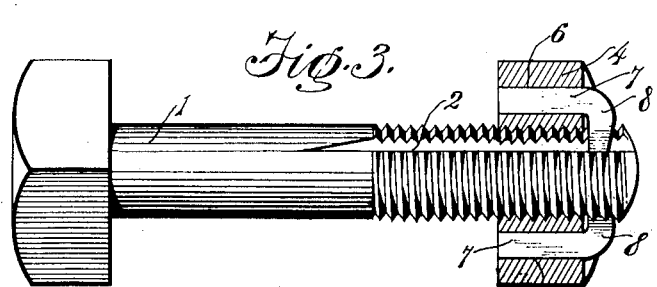
Figure 4:
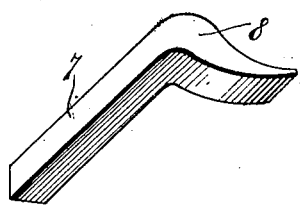

Figure 1 is a side elevation of a nut locked to its bolt in accordance with the invention; Fig. 2 is an end view of the same; Fig. 3 is a longitudinal section taken on the plane indicated by the line 3—3 in Fig. 2; and Fig. 4 is a perspective view of one of the locking pawls.

In the drawings 1 denotes a bolt of ordinary construction having formed in its screw threaded end longitudinal grooves or channels 2 which are substantially V-shaped and each of which has a radial wall and an inclined wall. While any number 6f said grooves may be provided, two are preferably employed and arranged at diametrically opposite points on the bolt, as illustrated.

4 denotes a nut of rectangular or other shape having a threaded bore to receive the threads on the bolt and having in its outer end one or more recesses 5 which intersect the threaded bore. In said recesses are formed rectangular openings 6 to receive rectangular shanks 7 of resilient locking pawls 8 which are adapted to enter the grooves 2 and prevent the nut from being turned off of the bolt. Said pawls are of right angular shape, one arm forming the shank 7 and the other arm being slightly curved and tapered. The pawls 8 lie within the recesses 5 and are prevented from springing out of the grooves 2 by the walls of said recesses and when it is desired to remove the nut from the bolt said pawls may be sprung out of the recesses and out of said grooves to permit the nut to be turned off of the bolt.

Having thus described the invention what is claimed is:

In a nut lock, the combination with a threaded bolt having longitudinally extending V-shaped grooves formed in its threaded portion, of a nut arranged upon the bolt and formed in its outer end with recesses intersecting the bore of the nut and having in their bottoms rectangular openings, resilient pawls of right angular form having squared shanks fixed in said openings and curved and tapered ends arranged in the recesses and adapted to engage the grooves in the bolt to retain the nut upon the latter.

In testimony whereof I hereunto affix my signature in the presence of two witnesses.

JOHN JAMES GALEY.

Witnesses:
D. A. BULLINGTON,
W. T. BROWNING.